Nov. 2, 1965  W. K. JEKAT  3,214,990
GEARED TURBINE

Filed Dec. 27, 1962  2 Sheets-Sheet 1

WALTER K. JEKAT
INVENTOR.

BY Daniel H. Bobis
Atty

Nov. 2, 1965  W. K. JEKAT  3,214,990
GEARED TURBINE

Filed Dec. 27, 1962  2 Sheets-Sheet 2

WALTER K. JEKAT
INVENTOR.
BY Daniel H. Bobis
Atty

United States Patent Office

3,214,990
GEARED TURBINE
Walter K. Jekat, Upper Montclair, N.J., assignor to Worthington Corporation, Harrison, N.J., a corporation of Delaware
Filed Dec. 27, 1962, Ser. No. 247,752
6 Claims. (Cl. 74—421)

This invention relates to a torque transmitting mechanism and particularly to an improved unit adapted to transfer torque at high rotational velocities.

An object of the invention is to provide a mechanical transmission adapted to connect to a turbine shaft or other high speed prime mover for transferring motion therefrom.

A further object is to provide a rotational transmission unit particularly adapted to overcome vibrational tendencies at high speed.

A still further object is to provide a transmission unit connecting an input shaft and an output shaft operating at different rotational speeds.

Another object is to provide a transmission connecting in-line shafts, one of which is coupled to a prime mover for transmitting rotary motion to the other shaft.

A further object is to provide a torque transmitting unit of the type including a gear train through which rotational movement is transmitted between drive and driven shafts.

Another object is to provide a rotating torque transmitting member adapted to connect to a high speed turbine and including a gear train to impart rotation to a low speed shaft.

Still another object is to provide a high speed rotation transmitting member between substantially aligned shafts including a gear train adapted to maintain alignment of said shafts and to minimize the effects of vibration due to misalignment.

A still further object is to provide a transmission unit connecting an input and an output shaft and being journaled to maintain accurate alignment of said respective shafts.

Another object of the invention is to provide a transmission unit for axially aligned but spaced apart shafts, said unit being enclosed in a supporting casing adapted to journal the respective shafts with a speed reduction gear train as to maintain alignment of the shafts at high rotational speeds.

Other objects of the invention will become clear to those skilled in the art from the following description made in conjunction with the drawings in which:

The above and other objects of the invention are attained by provision of a compact speed reducing gear arrangement between serially disposed and aligned transmission shafts, at least one shaft being a drive member and the other a driven member. The shafts are spaced apart and connected through a gear train including a central gear, a plurality of intermediate gears, and a ring gear. During transmission of rotary motion between the respective shafts, misalignment due to the high speed and excessive vibration is avoided by provision of a rigid casing enclosing and supporting the respective shafts and transmission elements.

In accordance with the prominent features of the invention the drive and driven shafts are journaled at opposed ends of the rigid casing which also supports the gear train so as to maintain the connected shafts in coaxial alignment and to position the stationary intermediate gears radially equi-distant from a longitudinal axis extending through both of said shafts. The gear train and at least one of the shafts are connected to transfer rotary motion by a ring member longitudinally slidably, and rotatably carried on the train.

To facilitate the following description including structural details and operation of the invention, it is assumed that a high speed expander turbine is the driving element having its impeller attached to a first or drive shaft and imparting rotation to the second or low speed output shaft through a gearing arrangement. The output or low speed shaft is coupled to a driven element such as a pump, a compressor or a similar unit requiring rotational driving force.

Figure 1:
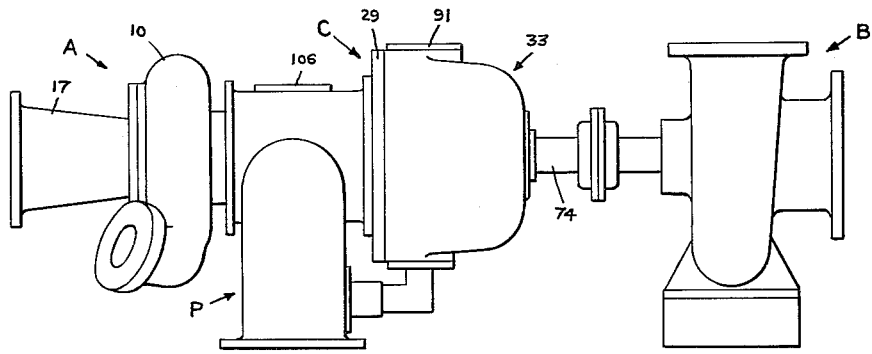
FIGURE 1 is a side elevation view of the present transmission unit coupled between spaced apart drive turbine and driven pump.

Referring to the drawings, FIGURE 1 illustrates an embodiment of the invention wherein a turbine or expander A is the prime mover for driving a pump, compressor or other rotatable mechanism generally designated as B. An elongated transmission unit C including a connecting shaft and gear train, transmit rotational motion from the expander shaft to the shaft of the driven compressor or pump B. The apparatus is mounted for convenience on a supporting base or pedestal P.

Figure 2:
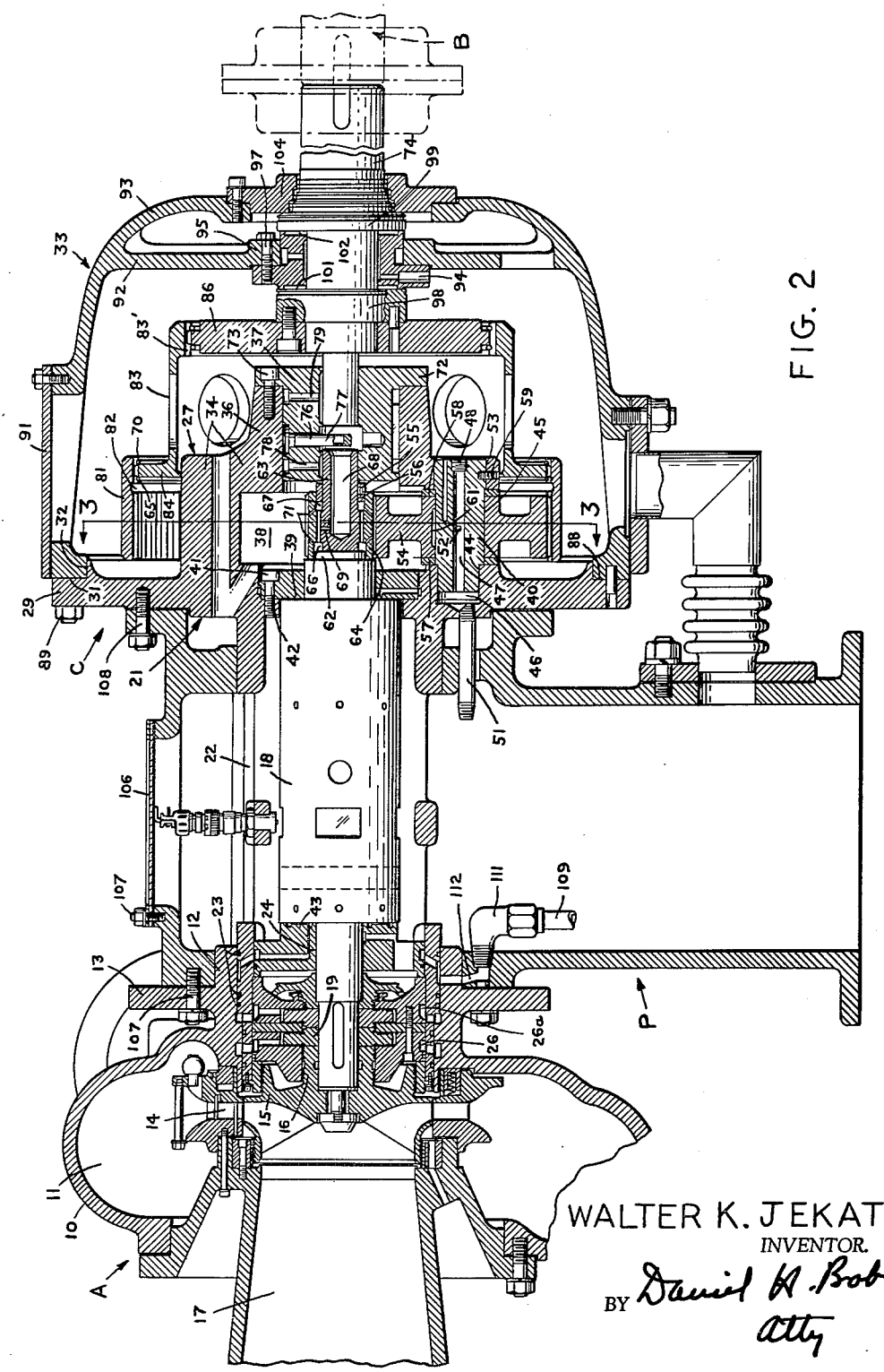
FIGURE 2 is a side cross sectional view on an enlarged scale of the arrangement shown in FIGURE 1.

The expander A as shown in FIGURE 2, in accordance with well known commercial practice includes a generally circular casing 10 defining a toroidal chamber 11 having an inlet to receive a fluidized power medium such as a stream of high pressure gas or steam.

Expander casing 10 includes a cylindrical portion 12 extending axially of the casing and having a peripheral flange 13 with circularly spaced holes for receiving fastening means. Chamber 11 forms an annular constricted opening 14 at the inner wall, introducing a high velocity stream of the power medium from chamber 11.

The expander movable element includes an impeller or wheel 15 having outwardly radiating vanes on one face which terminate at constricted annular opening 14. Incoming fluid impinging against the impeller vanes is discharged by way of an enlarged egress opening 17.

Impeller hub 16 depending from wheel 15, is keyed to one end of an elongated connecting shaft 18 having a heavy center section and reduced ends, and one end being journaled within the turbine casing cylindrical portion 12. A labyrinth seal 19 or similar packing means, surrounds the journaled shaft end to prevent leakage of fluid from the impeller casing during normal operation.

An elongated housing 21 includes a sleeve or cage 22 having one end supportably received in expander casing cylindrical portion 12. A plurality of flexible seal rings 23 are disposed about the cage outer surface and deformed to provide a tight annular seal against leakage of fluid. The cage as shown in FIGURE 2 comprises a relatively heavy walled cylinder having openings formed therein.

Labryinth seal 19, as well as shaft bearing 24, are fixedly positioned within the cage 22. Annular lubrication grooves 26 and 26a formed in the cage outer surface or the casing cylindrical portion, are interconnected to a pressurized source of lubricating oil to be described herein more fully.

Cage 22 extends longitudinally of connecting shaft 18, spaced outwardly thereof. A gear carrier 27 depends from cage 22 at the end remote from the expander. The gear carrier 27 includes a generally circular plate 29 having a diameter larger than carrier 27 and disposed substantially perpendicular to the cage central axis. Plate 29 outer rim is formed with a receiving edge 31 having an upstanding lip 32 disposed on the surface thereof to position a bell housing 33.

Figure 3:
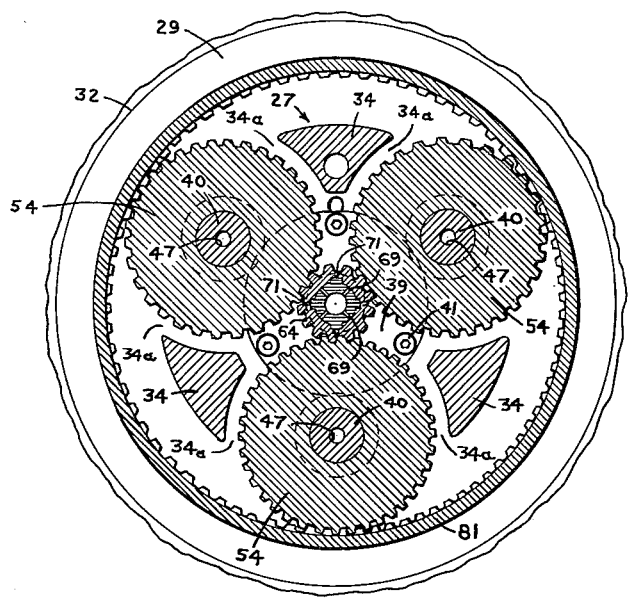
FIGURE 3 is a view in cross section taken along line 3—3 in FIGURE 2.

Gear carrier 27 as shown in FIGURES 2 and 3, includes a raised circular hub 34 depending centrally from plate 29, holding a plurality of intermediate gear assemblies. A boss 36 forms an extension to the hub 34 and supportably encloses a sleeve bearing 37.

Hub 34 comprises a relatively heavy walled member defining a circular central chamber 38. An opening at one end of chamber 38 is adapted to receive connecting shaft 18. Thrust bearing 39 is rigidly positioned at said chamber 38 opening by circularly spaced screws 41 engaged with an annular intruding collar 42 at the cage inner surface.

A second thrust bearing 43, spaced along shaft 18 from bearing 39, is positioned at the shaft end adjacent the expander casing 12. The respective thrust bearings are spaced apart sufficiently in the supporting cage to engage annular shoulders formed on the shaft and thus absorb diametrally opposed axial forces exerted on the shaft during operation.

Hub 34 as seen in FIGURE 3 is provided with a plurality of radial openings 34a extending through the circumferential wall thereof to chamber 38. Each opening is bored with a concentric passage disposed parallel to center axis of shaft 18 to support an intermediate gear shaft 40. Shafts 40 are preferably three in number as shown, but may be greater or less to properly function in the gear train.

The respective gear shafts 40 are also circumferentially equi-spaced as shown in FIGURE 3, and essentially spaced equi-distant from the center axis of shaft 18, extending parallel to the latter.

Each gear shaft 40 includes a relatively narrow shank 44 terminating at a peripheral shoulder. The shank is force fitted into narrow bore 46 with the peripheral shoulder disposed against the surface of plate 29.

Shaft 40 is provided with a center passage 47 extending axially therethrough and terminating at a plug 48 to define an open ended chamber. The chamber open end is communicated with the system force feed oil supply by way of conduit means 51 extending through plate 29 and connected directly to the oil supply. A second oil passage 52 carries lubricant from central passage 47 outwardly to the shaft bearing surface 45.

The shaft 40 end is provided with a head 53 having a diameter slightly larger than the shaft bearing surface 45. The head is closely received within a mating bore passing through the hub wall and in axial alignment with bore 46, thus assuring the shaft being rigidly held within the hub by means of a fastening device such as set screw 59.

Intermediate gear 54 is rotatably carried on the shaft bearing surface 45 and maintained centrally thereon by a pair of thrust washers 57 and 58 to minimize axial movement of the gear within hub opening 34a. The intermediate gear bore is provided with at least one lubrication cavity 61 normally connected with passage 52 to receive and supply the gear and shaft bearing surfaces with adequate lubricant.

Connecting shaft 18 is adapted to axially slidably engage the gear train. The shaft as shown in FIGURE 2 is splined at a reduced diameter end portion within the gear carrier chamber 38. The splines extend longitudinally along the shaft from shoulder 62 to a terminal bearing surface 63.

A central gear 64 having a center splined opening is axially slidably received on the splined portion of shaft 18. The gear bore is so formed adjacent the splined portion to define a pair of annular collection chambers 66 and 67. A set screw and washer 55 and 56 carried on shaft 18 hold gear 64 in position on the shaft.

The engaging splined portion or teeth of the respective central gear and shaft are closely dimensioned such that the connection provides not only an axially slidable relationship between the respective parts, but also affords a degree or radial flexibility of movement.

Central gear 64 thus is normally carried on shaft 18 in meshed engagement with and supported by the three outwardly spaced intermediate gears 54.

Lubrication of the inter-meshed toothed surfaces of the intermediate and central gears is provided by injecting a stream of lubricant into central chambers 68 formed into the connecting shaft end. At high rotational speeds, centrifugal force carries oil through passage 69, thence into annular passages 66 and 67, which communicate through small radial passage 71 with the gears meshing teeth.

Boss 36 formed on hub 34 is provided with a sleeve bearing 37 having a flange 72 held against the hub surface by screws 73. Bearing 37 in the present embodiment of the invention is provided with a central bore which journals the connecting shaft 18 at the shaft bearing surface, and the overhung end of second or driven shaft 74.

The bearing 37 central bore is circumferentially grooved or otherwise provided with means to furnish continuous lubrication to the respective bearing surfaces. As shown, a central passage 76 positions an oil injector 77 having a discharge opening adjacent the end of shaft 18 to feed a pressurized oil stream into central chamber 68.

Radial passages 78 and 79 are connected to central passage 76, said radial passages being positioned to carry oil inwardly to the bearing surfaces. Conduit means not presently shown in detail extends from the lubrication oil supply to central passage 76 and ejector 77 respectively carrying oil to the latter.

A ring gear 81 includes internal teeth carried in meshed engagement with the three intermediate gears 54. The ring gear inner toothed surface is provided with a circumferential groove 82 separating the teeth into a meshed portion in engagement with the intermediate gears, and a non-meshing adjacent portion.

An elongated cylindrical torque element 83 includes a toothed peripheral flange 84 disposed in axial slidable engagement with the non-meshing toothed portion of ring gear 81. The inner edge of flange 84 is spaced outwardly of the stationary hub surface to provide clearance therebetween as the torque element rotates.

A second internally toothed portion 83' of torque element 83 is axially slidably engaged with a splined disc 86 carried on the second shaft 74. Reduced speed rotary motion of the gear train is transmitted through torque element 83 to the disc 86 without substantial loss of power due to friction, vibration or shaft misalignment.

The engaged though non-meshed connection of toothed surfaces on torque element 83 with corresponding surface on ring gear 81 and disc 86 is facilitated by use of non-rigid coupling means. For example, ring gear 81 is provided with a pair of spaced grooves holding snap rings 65 and 70 respectively. The rings are disposed laterally of the torque element toothed edge to permit a limited degree of relative axial movement therebetween.

Similarly, a pair of rings locates torque element 83 relative the fixed disc 86, thus in effect positioning ring gear 80. This flexible interconnection of rotating parts is more fully described in my co-pending application Serial No. 225,180, filed on September 21, 1962, now Patent No. 3,174,353.

The rigid bell housing 33 is provided at the open end with a circular seating surface 88 and is removably held to flange plate 29 by a plurality of peripherally spaced mounting studs or screws 89. Seating surface 88 is accurately positioned against receiving edge 31 and upstanding lip 32, to define a substantially oil tight enclosure about transmission parts. Following the preferred practice in coupling such mating parts, a gasket or other sealing means may be interposed between the respective abutting surfaces to assure an oil tight engagement at the interface. A removable cover plate 91 bolted to the bell housing, affords access to the bell housing interior and also permits continual visual inspection when the cover plate is heavy glass or other transparent substance.

Bell housing 33 as shown in FIGURE 2 includes a generally circular wall disposed about the gear carrier 27, and an end wall constituting a pair of slightly spaced panels 92 and 93 joined to the circular wall.

Inner panel 92 forms an opening to receive bearing 94 disposed in coaxial alignment with sleeve bearing 37 which alignment is easily achieved by the exact flange fits 31, 32, 88. Bearing 94 is fixedly positioned in the bell housing opening by mounting screws 97 fastened in circular arrangement to rim 95.

Bearing 94 may be of the split type and closely fitted intermediate spaced collars 98 and 99 on shaft 74 to provide bearing surfaces against both radial and axial thrust. The center bore, as well as lateral faces 101 and 102 respectively of bearing 94 are formed with lubricating grooves connected to the lubricating pump system in a manner similar to the arrangement described herein with relation to the bearing 37.

As seen in FIGURE 2, one of the shaft collars 98 supports disc 86 through bolts 103 or by similar fastening means to hold the disc as an integral though removable part of the low speed shaft 74.

The second or outer panel 93 of bell housing 33 includes an enlarged opening passing shaft 74 therethrough and is further provided with a shaft seal means 104 to prevent loss of lubricant through the rotating shaft.

The entire transmission unit is supportably mounted on pedestal P. The pedestal is adapted to slidably receive the entire transmission casing in such a manner that the latter together with its transmission elements, may be removed as a unit. This latter feature permits easy disassembly of the transmission from the turbine and the driven member respectively for the purpose of replacing or repairing parts within the transmisison train. Pedestal P engages the turbine casing by a plurality of studs 107 and engages plate 29 of the integral intermediate gear cage 21, 27 by similar fastening studs 108. Thus, the composite turbine transmission and pedestal are rigidly supported as a unit. The upper portion of the pedestal may be provided with a removable closure plate 106 affording access to the interior of the unit as needed.

Referring again to FIGURE 2, the lubrication system herein referred to comprises, a reservoir or sump for lubricant not presently shown in the drawings but which may be disposed at a convenient location such as in the lower portion of pedestal P to receive drained oil. A lubrication pump associated with the reservoir is connected to a plurality of branch conduits which may be directed to different portions of the friction generating transmission surfaces. For example, the lubrication pump is connected directly to conduit 109 having an oil fitting 111 carried on the pedestal wall and in communication with oil passage 112 providing a force feed supply of lubrication to the radial and thrust bearing 24 and 43 respectively, and to intermediate faces between said bearing and the shoulder of connecting shaft 18.

Referring to FIGURE 2, the casing member or cartridge enclosing transmission elements has been described as constituting an elongated cage having a gear carrier affixed to one end thereof. While this part is here shown as a single element which may be either a metal casting, a forging or of welded construction, it is understood that the respective parts may be so made up and assembled as to form the unitary elongated cartridge.

When the later construction is employed, in accordance with prescribed practice, the separate elements such as the flange 29, gear carrier 27 and boss 36 may be suitably fastened and or pinned together as to preclude relative movement therebetween.

To provide accurate alignment of cooperating parts within the transmission cage, peripheral lip 32 upstanding from the face of plate 29 is machined concentrically with the center bore of bearing 37. Similarly, as shown in FIGURE 3 the pitch circle for the respective circularly disposed intermediate gear shafts are accurately positioned equi-distant from the center of bearing 37 to permit proper engagement of the central gear 64 carried on the shaft 18, and the respective intermediate gears 54.

Also, the seating surface 88 of bell housing 33 which may be of steel or cast iron construction, includes a guiding face which slidably engages the lip 32 on plate 29. Thus, the bell housing is accurately disposed with respect to lip 32 and consequently with the center of the transmission elements. Panel 93 in housing 33 is fabricated in such manner that the guide lip 32 at the seating surface 88 is concentrically arranged with the center line of bearing 94 positioned within panel 92. Thus, sleeve bearing 94 together with bearing 37 will accurately position shaft 74 in alignment with connecting shaft 18 and preclude or at least greatly reduce vibratory tendencies that might be set up at high speeds due to any slight misalignment of the rapidly rotating parts.

Referring to FIGURE 2, an alternate embodiment of the arrangement above described may include a connecting shaft 18 having the central gear carrying end normally positioned external to bearing 37. Thus shaft 18 would be journaled at bearing 24 and also at bearing 39 which would provide both thrust bearing surfaces and radial bearing surfaces. A further modification of the latter design permits the central gear carrying end of shaft 18 to be supported by the three or more intemediate gears arranged radially thereabout.

In a still futher embodiment of the shaft connection shown in FIGURE 2, rather than have the respective shaft ends spaced apart and journaled within bearing 37, said shafts may be brought into actual contact. By such means, the center opening 68 is sufficiently large to receive a sleeve bearing adapted to carry the end of shaft 74 thus in effect journaling one shaft within another. This latter mentioned construction is not favored however since the interconnected disposition of shafts and bearings presents certain lubricating difficulties particularly with counter rotating shafts.

While the above described embodiments of the invention are meant to delineate the constructional features and the cooperating relationship of transmission elements, it is not intended that the disclosed embodiment be so limited. It is understood by one skilled in the art that certain modifications and changes might be made in the arrangement without departing from the spirit and scope of the invention.

For example, as a matter of practicality, the novel arrangement could be reversed whereby a low speed input shaft drives a higher speed output shaft.

It is clear however that the rigid transmission casing supporting the gear train and associated shafts permits continuous vibration free operation. When accurately fabricated and assembled, the transmission unitary cartridge permits a degree of speed and efficiency in on site replacing of such units as has never been heretofore known.

What is claimed is:

1. In a turbine-transmission assembly including a turbine having a casing with a passage formed therein and an impeller rotatably positioned within said passage, the improvement comprising, a transmission unit including housing means having an elongated cage portion slidably supported in said passage, readily disconnectable attachment means attaching said housing to said casing, a shaft support hub depending from said elongated cage portion and defining an enclosure at the extremity thereof remote from said turbine casing, bearing means carried by said cage portion, a first shaft rotatably journaled by said bearing means in said cage portion adjacent opposite ends thereof and having one end thereof coupled to said turbine impeller and the other end thereof extending into said enclosure, a gear train including a central gear, a plurality of intermediate gears rotatably supported from said shaft support hub in meshed engagement with said central gear, and a ring gear meshed with said intermediate gears, said central gear being positioned within said enclosure on the other end of said first shaft, a second shaft having one end extending into said enclosure and the other end thereof extending therefrom through said housing for the transmission of power therewithout, additional bearing means supported from said shaft supporting hub within said enclosures for rotatably supporting said other end of said first shaft and said one end of said second shaft therewithin and maintaining the said shaft ends in substantial coaxial alignment, and torque transmission means secured to said second shaft and engaged with said ring gear for transmitting rotary motion therebetween whereby, said first and second shafts may be maintained in substantially coaxial alignment and said transmission unit may be readily removed from said turbine through the disconnection of said attachment means and movement of said unit away from said turbine casing to withdraw said cage portion from said passage.

2. In a turbine-transmission assembly as in claim 1 wherein, the diameter of said turbine casing passage is greater than the diameter of said impeller whereby, said impeller may be removed from said turbine through said passage along with said first shaft of said transmission unit.

3. In a turbine-transmission assembly as in claim 1 wherein, said housing means include plate means extending from said shaft support, hub, panel means for enclosing said central, intermediate and ring gears, and second readily disconnectable attachment means for attaching said plate means and said panel means with said second shaft extending rotatably through said panel means to without said housing whereby, the disconnection of said second attachment means will enable the removal of said panel means, said second shaft, and said torque transmitting means from said transmission unit to enable the inspection of said ring, intermediate, and central gears, respectively.

4. In a turbine-transmission assembly as in claim 3 wherein, the diameter of said passage is larger than the diameter of said turbine impeller whereby, said impeller may be removed from said turbine through said passage along with said second shaft.

5. In a turbine-transmission assembly including a turbine having a casing with a passage formed therein and an impeller rotatably positioned within said passage, the improvement comprising, a transmission unit including housing means having an elongated cage portion slidably received in said passage, readily disconnectable attachment means attaching said housing to said casing, a shaft support hub depending from said elongated cage portion and defining an enclosure at the extremity thereof remote from said turbine casing, a first shaft rotatably journaled in said cage portion and having one end thereof coupled to said turbine impeller and the other end thereof extending into said enclosure, a gear train including a central gear, a plurality of intermediate gears rotatably supported from said shaft support hub in meshed engagement with said central gear, and a ring gear meshed with said intermediate gears, said central gear being positioned within said enclosure on the other end of said first shaft, a second shaft having one end extending into said enclosure and the other end thereof extending therefrom through said housing for the transmission of power therewithout, bearing means supported from said shaft supporting hub within said enclosure for rotatably supporting said other end of said first shaft and said one end of said second shaft therewithin and maintaining the said shaft ends in substantial coaxial alignment, and torque transmission means secured to said second shaft and engaged with said ring gear for transmitting rotary motion therebetween, with the diameter of said turbine casing passage being greater than the diameter of said impeller whereby, said first and second shafts may be maintained in substantially coaxial alignment, and said transmission unit and said turbine impeller may be readily removed from said turbine through the disconnection of said attachment means and movement of said unit away from said turbine casing to withdraw said cage portion, first shaft and turbine impeller from said passage.

6. In a turbine-transmission assembly as in claim 5 wherein, said housing means include plate means extending from said shaft support hub, panel means for enclosing said central, intermediate and ring gears, and readily disconnectable attachment means for attaching said plate means and said panel means with said second shaft extending rotatably through said panel means to without said housing whereby, the disconnection of said second attachment means will enable the removal of said panel means, said second shaft, and said torque transmitting means from said transmission unit to enable the inspection of said ring, intermediate, and central gears, respectively.

References Cited by the Examiner
UNITED STATES PATENTS

| | | | |
|---|---|---|---|
| 1,299,156 | 4/19 | Fast | 74—801 |
| 1,971,968 | 8/34 | Schmitter | 74—421.5 |
| 1,985,964 | 1/35 | Warren | 74—421.5 |
| 2,170,548 | 8/39 | Christian | 74—421.5 |
| 2,495,988 | 1/50 | Sheppard | 74—801 |
| 2,583,872 | 1/52 | Newcomb | 74—801 X |
| 2,703,021 | 3/55 | Stoeckicht | 74—410 |
| 2,863,324 | 12/58 | Cain et al. | 74—410 |
| 3,011,365 | 12/61 | Stoeckicht | 74—801 |
| 3,021,731 | 2/62 | Stoeckicht | 74—801 |
| 3,034,369 | 5/62 | Marchand | 74—409 X |

DON A. WAITE, *Primary Examiner.*